United States Patent [19]

Upton, Jr.

[11] 4,277,134
[45] Jul. 7, 1981

[54] FIBER OPTIC LOOP SIGNAL COUPLER APPARATUS

[75] Inventor: Robert W. Upton, Jr., Seminole, Fla.

[73] Assignee: Honeywell Inc., Minneapolis, Minn.

[21] Appl. No.: 870,907

[22] Filed: Jan. 19, 1978

[51] Int. Cl.³ .............................. G02B 5/14
[52] U.S. Cl. .................. 350/96.20; 350/96.15
[58] Field of Search .............. 350/96.20, 96.15; 225/227

[56] References Cited

U.S. PATENT DOCUMENTS

| 3,922,063 | 11/1975 | Marrone | 350/96.15 |
|---|---|---|---|
| 3,982,123 | 9/1976 | Goell et al. | 350/96.15 |
| 4,027,945 | 6/1977 | Iverson | 350/96.20 |
| 4,088,387 | 5/1978 | Lewis | 350/96.20 |
| 4,107,517 | 8/1978 | Cooper | 350/96.15 |
| 4,165,913 | 8/1979 | Fitch | 350/96.15 |

FOREIGN PATENT DOCUMENTS 2409455  9/1975 Fed. Rep. of Germany ........ 350/96.15

*Primary Examiner*—Stewart J. Levy
*Attorney, Agent, or Firm*—Charles L. Rubow

[57] ABSTRACT

Fiber optic rotary coupler apparatus is disclosed in which a light signal formed in a continuous ring in a plane is transmitted between a barrel and a surrounding sleeve within which the barrel is rotatably mounted. The light signal ring is produced by a light source and an associated light transmitting fiber wound on the barrel in at least one complete circular loop of a radius such that a portion of a light signal introduced into an end thereof is transversely radiated from the fiber. Light detector means, which may include a further optical fiber for transmitting light signals to a remote detector, is carried on the sleeve. In one embodiment, a plurality of optical and electrical signal channels are incorporated into a single device.

14 Claims, 5 Drawing Figures

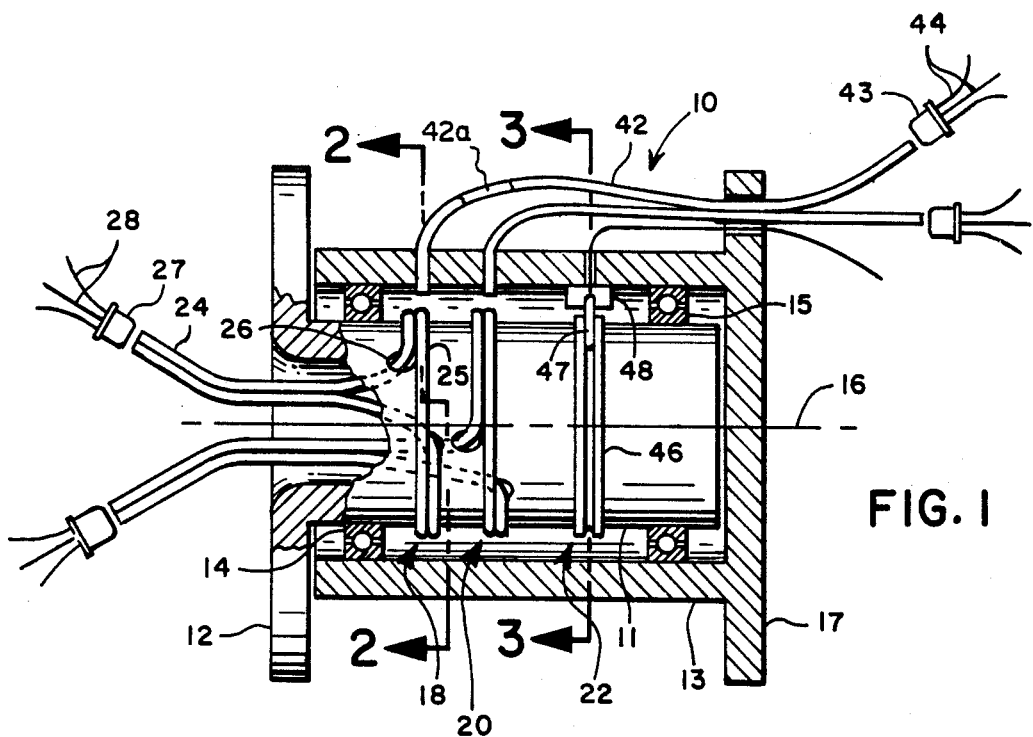
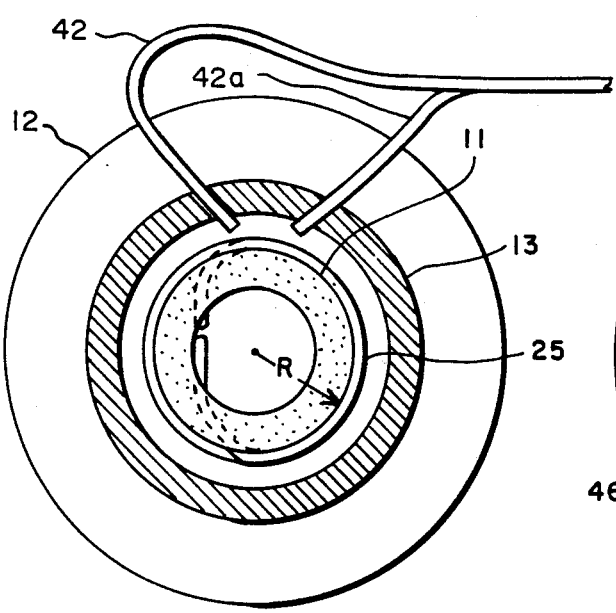
FIG. 2
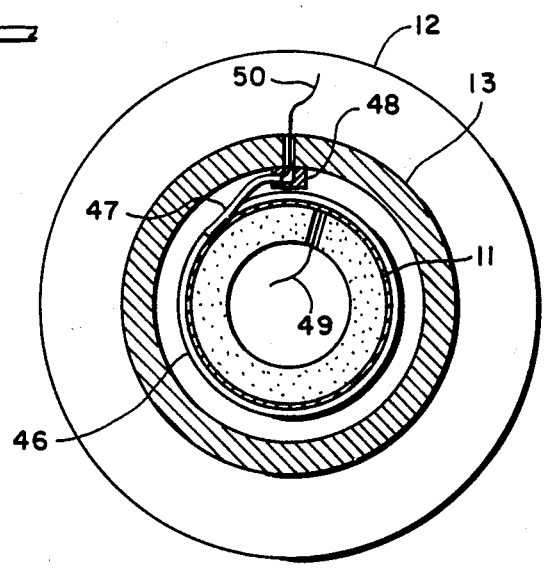
FIG. 3

FIBER OPTIC LOOP SIGNAL COUPLER APPARATUS

BACKGROUND OF THE INVENTION

The present invention relates generally to apparatus for transmitting signals between two relatively rotatable members. More specifically, the invention involves signal coupler apparatus wherein light signals in a continuous ring in a plane are transmitted between rotatable members without physical contact. The invention offers particular advantages in low cost, multiple channel rotary signal coupler apparatus.

Requirements to transmit electrical power and data across rotary joints have existed for many years. Traditionally, such functions were accomplished with electromechanical sliding contact slip rings. Early slip ring applications, including those for data transmission, typically involved the transmission of appreciable amounts of power. Sliding contacts were well suited to transmission of signals characterized by significant voltages and/or currents.

As technologies requiring the use of slip ring apparatus progressed, the inherent characteristics of electromechanical slip rings began to impose increasingly severe limitations on system performance. More specifically, advancing technologies required increased channel capacity combined with overall size reduction, decreased cross coupling of signals on separate channels, and decreased noise, dead band and power consumption. Attempts to reduce friction levels by reducing contact pressure increased the susceptibility of sliding contacts to lift during vibration, thereby introducing noise and/or signal interruptions. In addition, the lower power levels of contemporary data signals tended to reduce immunity to contact contamination, and consequently to increase the likeihood of signal interruption and/or distortion.

An additional limitation on the use of electromechanical slip rings relates to cost. Precious metals have been used to provide good electrical conduction at low contact forces, and to decrease the amount of maintenance required to keep contact surfaces adequately free of contamination and oxides. Modern plating techniques have helped to reduce the cost of precious metals required in a slip ring assembly. Nevertheless, the precious metal cost for a typical small assembly is several hundred dollars. An additional cost item arises from cleaning and maintenance operations which are routinely necessary several times a year, and which require the services of specially trained and experienced technicians.

one technology which has recently shown considerable promise for overcoming the noted problems involves the transmission of light signals between relatively rotating members. In general, the known devices utilizing this techique comprise a pair of members, one of which is rotatable with respect to the other about an axis of rotation. One of the members carries a light detector which is aligned with a light source carried by the other member. Accordingly, light signals, which may be modulated to convey data or information of interest, are transmitted across the moving/stationary interface without physical contact between the relatively moving members. Typical known forms of such devices are disclosed in U.S. Pat. Nos. 3,401,232, 3,922,063 and 4,027,945 issued respectively to J. S. Goldhammer et al on Sept. 10, 1968, F. A. Marrone on Nov. 25, 1975 and M. L. Iverson on June 7, 1977. Each disclosed device employs a light source and a detector alinged with the axis of rotation. Multiple channels may be provided by arranging light sources and detectors on the axis of rotation and in concentric rings about the axis.

Such arrangements are practical and satisfactory for small numbers of channels. However, for larger numbers of channels the required area perpendicular to the axis of rotation becomes prohibitively large since the area increases approximately as the square of the number of channels. Further, where the light source and/or detector are implemented by spreading out the ends of light transmitting fibers of a fiber bundle into a ring as disclosed in U.S. Pat. No. 4,027,945, the number of fibers required to implement individual channels varies approximately as the square of the radius of the rings. For larger rings, a very large number of fibers becomes necessary, and it becomes increasingly difficult to evenly distribute the light signal around the ring. Further, such construction is generally somewhat unconventional, and the complexities of suitably distributing and maintaining alignment of the fibers contributes to the cost of the device.

The applicant has devised an optical rotary coupler design in which a single optical fiber or small fiber bundle formed in a circular loop is employed to radiate light signals transversely to an axis of rotation. The design is exceptionally simple and capable of implementation with a large number of identical channels axially spaced along the axis of rotation. Further, the design minimizes the necessity for complex distribution and alignment of fibers in an optical fiber bundle. Accordingly, the advantages of using light signals to transmit data across a rotating/stationary interface are provided at minimum cost.

SUMMARY OF THE INVENTION

The applicant's unique fiber optic rotary coupler apparatus basically comprises a light transmitting fiber through which light is normally longitudinally transmitted, and from which light escapes or is accepted transverse to the length of the fiber if it is bent into a radius within a predetermined range of radii. The fiber is carried on a first member which is rotatable relative to a second member about an axis of rotation, and which maintains the fiber in at least one complete circular loop having a radius within the predetermined range, the loop being centered on the axis of rotation and generally lying in a plane perpendicular thereto. A light source or detector fixed relative to the first member is oriented to project light signals into an end of the fiber, or to receive light signals therefrom. A light detector or source carried by the second member is positioned to receive light signals transversely radiating from the fiber, or to project light signals transversely into the fiber. The fiber may be arranged so that both ends thereof are positioned to receive light signals from the light source. A multiple channel device may be implemented by arranging a plurality of identical fiber loops and corresponding light detectors along the axis of rotation.

The primary object of this invention is to provide an exceptionally simple and low cost fiber optic rotary coupler design.

It is a further object of this invention to provide a simple, low cost optical rotary coupler configuration which is adaptable to a large number of signal channels.

A further object is to provide a fiber optic rotary coupler wherein data is transmitted by light signals radiating transversely from or into an optical fiber loop.

Yet a further object is to provide rotary coupler apparatus which is well suited to both optical and electromechanical channels.

Additional objects of the invention may be ascertained from a study of the disclosure, drawings and appended claims.

BRIEF DESCRIPTION OF THE DRAWINGS

FIG. 1 is a longitudinal cross sectional view of multiple channel fiber optic rotary coupler apparatus in accordance with the applicant's invention;

FIG. 2 is a cross sectional view of the fiber optic rotary coupler apparatus of FIG. 1 taken along lines 2—2, the elements being arranged to transmit signals in one direction across a rotating/stationary interface;

FIG. 3 is a cross sectional view of the fiber optic rotary coupler apparatus of FIG. 1 taken along lines 3—3;

DESCRIPTION OF THE PREFERRED EMBODIMENT

Figure 4:
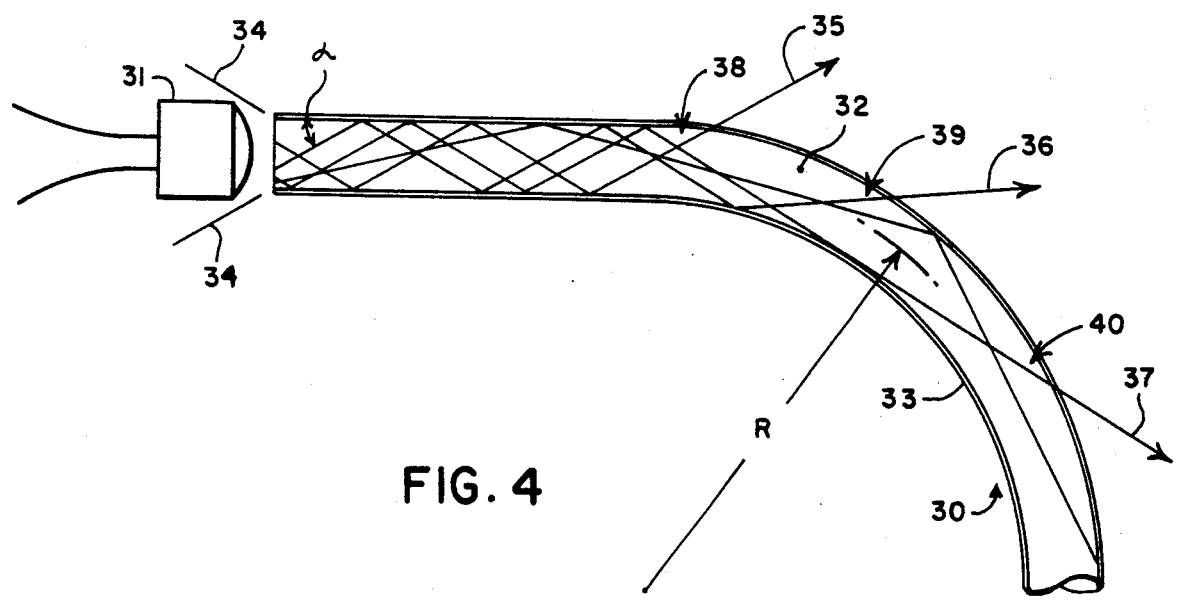
FIG. 4 is an illustration of a bent optical fiber demonstrating the process by which light is transversely radiated from the bent fiber.

In FIG. 1, reference numeral 10 generally identifies multiple channel rotary coupler apparatus in accordance with the applicant's invention. Apparatus 10 comprises a first member 11 including a flange 12 to facilitate attachment to a first body which may comprise a portion of equipment in which it is necessary to transmit signals across a rotating/stationary interface. As shown in FIGS. 1-3, member 11 is configured as a barrel having a circular cross section.

Member 11 is carried in a member 13 by means of a pair of bearings 14 and 15, and is rotatable relative thereto about an axis of rotation 16. Member 13 incudes a flange 17 to facilitate attachment to a second body which also comprises a portion of equipment in which transmission of signals across a rotating/stationary interface is required. As shown in FIGS. 1-3, member 13 is configured as a sleeve extending over barrel 11 along axis 16.

For illustrative purposes, coupler apparatus 10 is shown with two optical channels 18 and 20 and an electromechanical channel 22. Both optical channels are identical. Only channel 18 will be described in detail.

Channel 18 includes a first light transmitting fiber 24 which is wound in at least one complete circular loop 25 around the periphery of barrel 11. Both ends of fiber 24 are routed through holes 26 and the hollow interior of barrel 11 to a light source 27 in a fixed position relative to the barrel. Light source 27 may comprise a light emitting diode which radiates a light signal in response to electrical signals supplied thereto on leads 28. As will be explained with reference to FIG. 4, light source 27 is oriented to radiate a light signal into at least one end of fiber 24 from a direction within the cone of acceptance of the end of the fiber. Loop 25 is centered on axis 16 and generally lies in a plane perpendicular to the axis. Loop 25 radiates a light signal in a continuous ring transverse to the axis of fiber 24 in the plane of the loop.

FIG. 4 shows an enlarged view of a portion of a light transmitting fiber 30 having a light emitting diode 31 positioned and oriented to radiate a light signal into an end of the fiber. Fiber 30 is a conventional light transmitting fiber comprising a core 32 surrounded by cladding 33, the core and cladding having different indices of refraction. Light radiated into an end of fiber 30 from a direction within a cone of acceptance represented by lines 34 is longitudinally transmitted through the fiber by total internal reflection. More specifically, light entering the end of fiber 30 from within the cone of acceptance is incident on the core/cladding interface at an angle no greater than a critical angle $\alpha$. Under such conditions, light continues to propogate along the fiber as illustrated by the rays within the straight portion of the fiber.

However, if fiber 30 is bent into a radius R as illustrated, the angle of incidence of a ray near the critical angle in the straight portion of fiber 30 may exceed the critial angle at the outer core/cladding interface in the bent portion of the fiber. As illustrated in FIG. 4, the critical angle has been exceeded by rays 35, 36 and 37 at 38, 39 and 40 respectively. Under such circumstances, light radiates from fiber 30 transverse to the longitudinal axis of the fiber. Reference may be made to U.S. Pat. Nos. 3,936,631 and 3,982,123 issued respectively to W. M. Muska and J. E. Goell et al. on Feb. 3 and Sept. 21, 1976 for additional explanation of the foregoing phenomena in connection with fiber optic power taps.

As shown in FIG. 2, barrel 11 is sized so that loop 25 has a radius R. Accordingly, loop 25 radiates a light signal in a continuous ring in the plane of the loop. The light signal is detected by light detector means shown in FIGS. 1 and 2 as comprising light transmitting fibers 42 and 42a. Each of these fibers has one end positioned by sleeve 13 so as to lie in the plane of the loop, the fiber end being oriented toward an outer surface of the loop at an acute angle which will provide for reception of transversely radiated light signals. A suitable orientation angle, as shown in FIG. 4, is an angle at which rays 35, 36 and 37 exit from fiber 30. Light signals entering opposite ends of fiber 24 are radiated from loop 25 in directions which have opposite components along the longitudinal axis of the fiber. Hence, detector fibers 42 and 42a may be advantageously used to achieve redundant signal transmission.

Fibers 42 and 42a are routed along the exterior of sleeve 13 to a light detector or photodetector 43 in a fixed position relative to the sleeve. Accordingly, light signals radiated from loop 25 are transmitted by fiber 42 to detector 43 where they are converted to electrical signals on leads 44.

Alternatively, fibers 42 and 42a could be omitted and one or more detectors 43 positioned to directly receive light signals radiated by loop 25. In addition, either embodiment might advantageously employ some form of baffling between adjacent channels to prevent cross coupling of light signals. One suitable baffle design comprises an opaque annular disk or washer mounted between adjacent channels in a plane parallel with the planes of the fiber loops. The washer would extend radially from the exterior surface of drum 11 nearly to the interior surface of sleeve 13. Accordingly, it would prevent light from one fiber loop from reaching the light detector means in adjacent channels.

Electromechanical slip ring channel 22 is of conventional design. Briefly, it comprises a conductive ring 46 carried on barrel 11 in a plane parallel with and spaced from the planes of the fiber optic channels. Conductive ring 46 has an outer surface configured with an annular V-shaped groove therein in which a brush or slider element 47 rides. Slider element 47 is mounted in a block 48 which is carried on sleeve 13. The electrical signals on ring 46 and slider 47 are carried therefrom by means of leads 49 and 50 respectively. Because of the geometrical similarities between the fiber optic and electromechanical channels, it is apparent that both types of channels may be readily incorporated into a single device in quantities required for any particular application.

Figure 5:
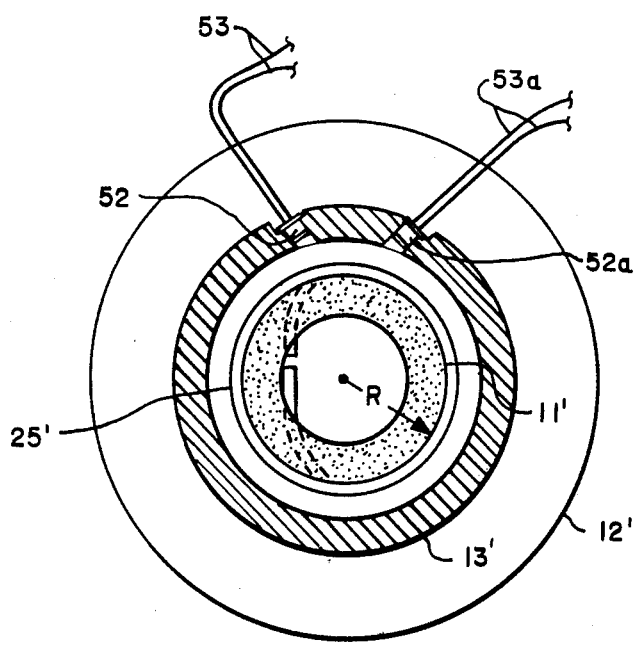
FIG. 5 is a cross sectional view similar to the cross sectional view of FIG. 2, but wherein the elements are arranged to transmit signals in the opposite direction across the rotating/stationary interface.

The disclosed fiber optic loop configuration is inherently bidirectional in that appropriately directed light signals will enter loop 25 transverse to the longitudinal axis of the optical fiber. With reference to FIG. 4, light signals will follow rays 35, 36 and 37 in a direction opposite to the indicated direction. FIG. 5 illustrates a fiber optic rotary coupler channel utilizing this characteristic.

Several of the elements forming the channel shown in FIG. 5 are identical to elements shown in FIG. 2. More specifically, a barrel 11' is rotatably carried in a sleeve 13'. An optical fiber is wound on barrel 11' in at least one complete circular loop 25'. A pair of light sources 52 and 52a are mounted within sleeve 13' in the plane of loop 25'. The sources are oriented to project light signals toward loop 25' in such a direction that the signals will enter the fiber. The ends of the fiber (not shown) are positioned to radiate the signals to one or more light detectors. Accordingly, light signals may be transmitted across a stationary/rotating interface from sleeve 13' to barrel 11'.

A preferred embodiment and several variations of fiber optic rotary coupler apparatus in accordance with the applicant's invention have been shown and described for illustrative purposes. Other embodiments which do not depart from the teaching herein will be apparent to those skilled in the art. The applicant does not intend that coverage be limited to the disclosed embodiment and variations, but only by the terms of the appended claims.

The embodiments of the invention in which an exclusive property or right is claimed are defined as follows:

1. Fiber optic rotary coupler apparatus for transmitting light signals between first and second bodies, one of which is rotatable relative to the other about an axis of rotation, comprising:
   a first light transmitting fiber of a type through which light is longitudinally transmitted by total internal reflection if said fiber is maintained at a radius no smaller than a predetermined critical radius, and from which light escapes transverse to the length of said fiber if said fiber is bent into a radius within a predetermined range of radii smaller than the critical radius;
   a first member adapted to be fixed to the first body, and adapted to carry said light transmitting fiber so that it is maintained in at least one complete circular loop having a radius within the predetermined range, the loop being centered on the axis of rotation and generally lying in a first plane perpendicular thereto;
   a first light source fixed relative to the first body and oriented to project a light signal into an end of said first light transmitting fiber;
   first light detector means; and
   a second member adapted to be fixed to the second body, and adapted to carry at least part of said first light detector means so that it is positioned to receive light signals which escape from said first light transmitting fiber.

2. The fiber optic coupler apparatus of claim 1 wherein:
   said first member comprises a barrel extending along the axis of rotation and having a radius within the predetermined range of radii;
   said first light transmitting fiber is wound around said barrel to form a complete circular loop; and
   said second member comprises a sleeve extending over said barrel along the axis of rotation.

3. The fiber optic coupler apparatus of claim 2 wherein said first light transmitting fiber is configured so that both ends thereof are positioned to receive light signals from said first light source.

4. The fiber optic coupler apparatus of claim 2 further including:
   a second light transmitting fiber similar to said first light transmitting fiber, said second light transmitting fiber being wound around said barrel so as to form a complete circular loop centered on the axis of rotation and generally lying in a second plane parallel with and spaced from the first plane;
   a second light source fixed relative to said first body and oriented to project a light signal into an end of said second light transmitting fiber; and
   second light detector means at least partially carried by said sleeve so that it is positioned to receive light signals which escape from said second light transmitting fiber.

5. The fiber optic coupler apparatus of claim 4 wherein each of said first and second light detector means includes a further light transmitting fiber interposed between one of said first and second light transmitting fibers and a light detector associated therewith, said further light transmitting fiber having a first end carried by said sleeve and oriented toward the loop in the associated light transmitting fiber at an acute angle relative to the length of the fiber, and a second end positioned to transmit light signals to the associated light detector.

6. The fiber optic coupler apparatus of claim 5 wherein said first and second light transmitting fibers are each configured so that both ends thereof are positioned to receive light signals from the light source associated therewith.

7. The fiber optic coupler apparatus of claim 6 further including an electromechanical slip ring channel comprising:
   a contact ring carried on said barrel in a third plane parallel with and spaced from the first and second planes;
   a slider element carried within said sleeve and positioned to engage said contact ring; and
   means for conducting electrical signals to said contact ring and said slider element.

8. Multiple channel fiber optic rotary coupler apparatus for simultaneously transmitting a plurality of light signals between two relatively rotatable bodies, comprising:

a barrel of a predetermined radius adapted to be connected to one of said bodies;

a sleeve adapted to be connected to the other of said bodies;

bearing means for carrying said barrel within said sleeve so as to permit relative rotation about an axis;

a plurality of light transmitting fibers wound on said barrel so that each forms at least one complete circular loop centered on the axis and generally lying in a separate plane perpendicular to the axis, each of said light transmitting fibers being operable by total internal reflection to longitudinally transmit a light signal introduced into an end thereof when said fiber is maintained at a radius larger than the predetermined radius, and to transversely radiate a portion of the light signal when said fiber is bent into the predetermined radius;

a plurality of light sources, each positioned to project a light signal into an end of a separate one of said plurality of light transmitting fibers; and a plurality of light detector means at least partially carried by said sleeve, each light detector means being positioned to receive light signals transversely radiating from a separate one of said plurality of light transmitting fibers.

9. The fiber optic coupler apparatus of claim 8 wherein each of said plurality of light detector means includes a further light transmitting fiber interposed between the associated one of said plurality of light transmitting fibers and a light detector associated therewith, said further light transmitting fiber having a first end carried by said barrel and oriented toward the loop in the associated light transmitting fiber at an acute angle relative to the length of the fiber, and a second end positioned to transmit light signals to the associated light detector.

10. The fiber optic coupler apparatus of claim 9 wherein each of said plurality of light transmitting fibers is configured so that both ends thereof are positioned to receive light signals from a separate one of said plurality of light sources.

11. The fiber optic coupler apparatus of claim 10 further including means for converting at least one of the light signals into a corresponding electrical signal.

12. Fiber optic rotary coupler apparatus for transmitting light signals between first and second bodies, one of which is rotatable relative to the other about an axis, comprising:

a light transmitting fiber of a type through which light is longitudinally transmitted by total internal reflection if said fiber is maintained at a radius no smaller than a predetermined critical radius, said light transmitting fiber being capable of receiving light directed transverse to an outer surface of said fiber at a location where said fiber is bent into a radius within a predetermined range of radii smaller than the critical radius;

a first member adapted to be fixed to the first body, and adapted to carry said light transmitting fiber so that it is maintained in at least one complete circular loop having a radius within the predetermined range, the loop being centered on the axis of rotation and generally lying in a first plane perpendicular thereto;

a light detector fixed relative to the first body and oriented to receive a light signal from an end of said light transmitting fiber;

light source means; and a second member adapted to be fixed to the second body, and adapted to carry at least part of said light source means so that it is positioned to radiate light signals which will be received by said light transmitting fiber.

13. The fiber optic coupler apparatus of claim 12 wherein:

said first member comprises a barrel extending along the axis of rotation and having a radius within the predetermined range of radii;

said light transmitting fiber is wound around said barrel to form a complete circular loop; and said second member comprises a sleeve extending over said barrel along the axis of rotation.

14. The fiber optic coupler apparatus of claim 13 wherein:

said light transmitting fiber is configured so that both ends thereof are positioned to transmit light signals to said light detector; and said light source means includes two light sources positioned to radiate light signals in directions which have opposite components along the longitudinal axis of said light transmitting fiber.

* * * * *